No. 836,413. PATENTED NOV. 20, 1906.
A. W. SWENDER.
MUZZLE.
APPLICATION FILED APR. 27, 1906.
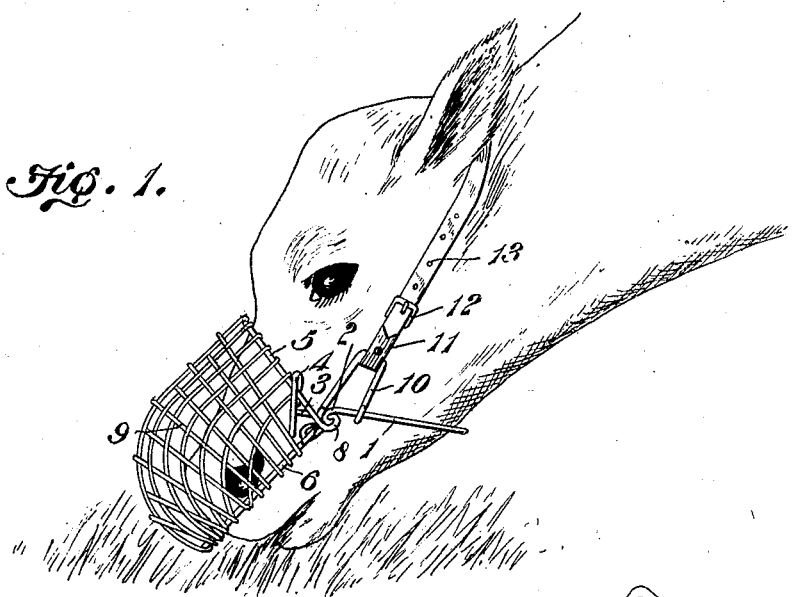
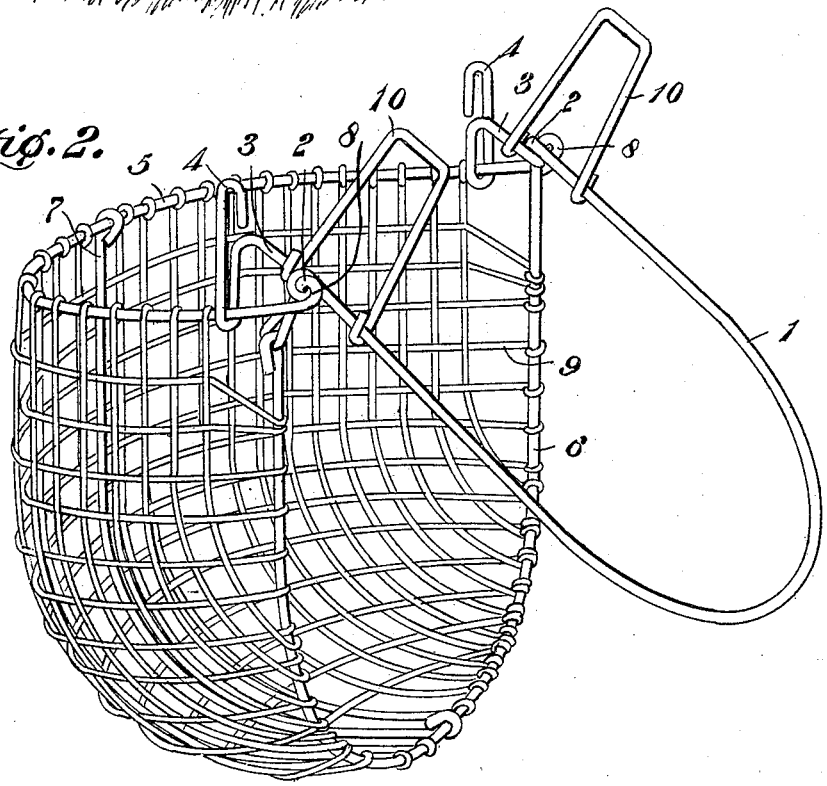
WITNESSES:
Albert W. Swender,
INVENTOR.
By C. A. Snow & Co.
ATTORNEYS
THE NORRIS PETERS CO., WASHINGTON, D. C.

UNITED STATES PATENT OFFICE.

ALBERT W. SWENDER, OF CARROLL, IOWA.

MUZZLE.

No. 836,413.    Specification of Letters Patent.    Patented Nov. 20, 1906.

Application filed April 27, 1906. Serial No. 314,019.

*To all whom it may concern:*

Be it known that I, ALBERT W. SWENDER, a citizen of the United States, residing at Carroll, in the county of Carroll and State of Iowa, have invented a new and useful Muzzle, of which the following is a specification.

This invention relates to muzzles for calves and other live stock; and its object is to provide a muzzle of the basket type which will not interfere with the animal when eating or drinking, but which will automatically assume a position over its mouth as soon as the head is raised from the ground. A great objection found in devices of this character as heretofore constructed has been the use of castings and leather straps, &c., which render the muzzle expensive and easy to get out of order. Where leather loops are employed to produce the proper action of a basket-muzzle, they soon become hard and break or rot, thereby rendering the device useless, and, moreover, said straps are often caught on fences or limbs of small trees and broken.

The object of this invention is to provide a basket-muzzle having all of its working parts formed of wire, thereby rendering the device very simple and inexpensive in construction as well as durable and attractive.

The invention consists of a bail adapted to be placed under the head of the animal and terminating in guide-loops. A basket is pivoted to the bail and extends into the loops so as to have a limited swinging movement. Supporting-loops extend upward from the end portions of the bail and are engaged by straps which are adapted to be secured over the head of the animal.

The invention also consists of certain other novel features of construction and combination of parts which will be hereinafter more fully described, and pointed out in the claims.

In the accompanying drawings is shown the preferred form of the invention.

In said drawings, Figure 1 is a view showing the muzzle applied and the position assumed by it when the animal is eating. Fig. 2 is a perspective view of the muzzle detached and showing the positions of the parts when the head of the animal is raised.

Referring to the figures by numerals of reference, 1 is a bail adapted to extend under the head of the animal, and the end portions of this bail are bent to form eyes 2, from which project arms 3, terminating in guide-loops 4, said loops extending laterally from the arms 3. A basket of peculiar form is used in connection with the bail and consists of a frame formed of U-shaped wires 5 and 6 disposed in planes at right angles to each other and connected at their centers by a curved brace-wire 7. The wires 5 and 6 can, if preferred, be formed in a single piece, and where they merge they produce eyes 8, which engage the eyes 2, so as to form a pivotal connection between the basket and the bail. The frame of the basket is covered by a coarse fabric 9, formed of heavy wire. This fabric does not extend into the corners of the basket where the eyes 8 are located, but instead leaves a clear space in which the loops 4 can work. These loops surround the upper wire 6 of the frame and serve, therefore, to limit the movement of the frame upon its pivots. Wire loops 10 are suitably fastened to the bail, adjacent each end thereof, and these loops straddle the eyes 2 and 8. To one of the loops 10 is riveted or otherwise secured a strap 11, which may be provided with a buckle 12, and another strap 13 is secured to the other loop 10 and is adapted to extend over the head of the animal and to be placed in engagement with the buckle.

The muzzle herein described is secured to an animal by placing the bail 1 under the head thereof so that the mouth will extend into the basket, and the straps 11 and 13 are then fastened over the head. When the head of the animal is raised from the ground, the upper wire 6 of the basket will rest by gravity upon the lower ends of the loops 4, and the basket will be supported under as well as in front of the mouth. When the head of the animal is lowered, however, the basket will remain in substantially the same relation to the horizontal, while the loops 4 will swing downward over the wire 6 until the upper ends of the loops come in contact therewith. This movement will be sufficient to permit the mouth of the animal to move into position back of the lower edge of the basket, so that said basket will not prevent the animal from eating or drinking.

It will be noted that all the working parts of the muzzle are formed of wire and cannot, therefore, get out of order if subjected to ordinary usage. The only leather employed is that which extends over the head of the animal; but it is apparent that by reason of their position these straps will not be likely to come into contact with fences, &c., with sufficient violence to be broken or otherwise injured. The entire muzzle is preferably galvanized or otherwise treated so as to be unaffected by moisture, and by reason of the fact that it is made of wire it can be constructed at slight cost.

I claim—

1. A muzzle comprising a bail having integral arms extending therefrom and terminating in guide-loops, means for securing the bail to the head of an animal, and a basket pivoted upon the bail and movably mounted within the guide-loops.

2. A muzzle comprising a wire bail bent to form eyes and terminating in outwardly-extending guide-loops, means for securing the bail to the head of an animal, and a basket movably mounted within the guide-loops and having integral eyes loosely engaging the eyes on the bail.

3. A muzzle comprising a bail bent to form eyes and terminating in outwardly-extending guide-loops, loops extending from the bail adjacent the eyes, means upon said loops for securing the bail to the head of an animal, and a basket pivotally connected to the eyes and movably mounted within the guide-loops.

4. A muzzle comprising a wire bail having eyes between its ends and terminating in outwardly-extending guide-loops, wire loops extending from and secured to the bail adjacent its eyes and adapted to be engaged by securing means, and a wire basket pivotally connected to the eyes and movably mounted within the guide-loops.

5. A muzzle comprising a wire bail having eyes between its ends and terminating in outwardly-extending guide-loops, wire loops extending from and secured to the bail adjacent its eyes and adapted to be engaged by securing the ends, U-shaped wires disposed at right angles to each other and merging to form eyes engaging the eyes of the bail, one of said wires extending through and movably mounted within the guide-loops, a brace-wire connecting said wires, and a wire fabric secured upon U-shaped and brace wires to form a basket.

In testimony that I claim the foregoing as my own I have hereto affixed my signature in the presence of two witnesses.

ALBERT W. SWENDER.

Witnesses:
J. J. MEYERS,
C. E. REYNOLDS.